(No Model.)

F. C. McCLARY.
REVERSING TAP HOLDER.

No. 531,382. Patented Dec. 25, 1894.

Witnesses:
J. A. Cantin
Arthur B. Jenkins

Inventor:
Frederick C. McClary
By Chas. L. Burdett
Attorney.

UNITED STATES PATENT OFFICE.

FREDERICK C. McCLARY, OF HARTFORD, CONNECTICUT.

REVERSING TAP-HOLDER.

SPECIFICATION forming part of Letters Patent No. 531,382, dated December 25, 1894.

Application filed April 7, 1894. Serial No. 506,732. (No model.)

*To all whom it may concern:*

Be it known that I, FREDERICK C. MCCLARY, a citizen of the United States, and a resident of Hartford, in the county of Hartford and State of Connecticut, have invented certain new and useful Improvements in Reversing Tap-Holders, of which the following is a full, clear, and exact description, whereby any one skilled in the art can make and use the same.

The object of my invention is to provide a device which may be used in any machine tool having a fast moving live spindle or arbor on which the device may be mounted and where it will serve the purpose of a tap holder containing within itself means for reversing the movement of the tap without compelling the spindle to which the device is secured to be reversed as to the direction of its rotary motion.

To this end my invention consists in the details of the several parts making up the tap holder as a whole and in the combination of such parts as more particularly hereinafter described and pointed out in the claims.

Figure 1:
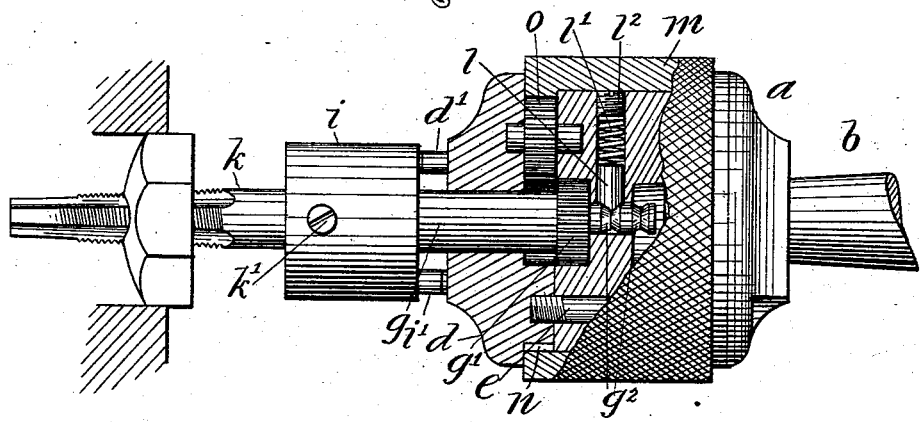
Figure 2:
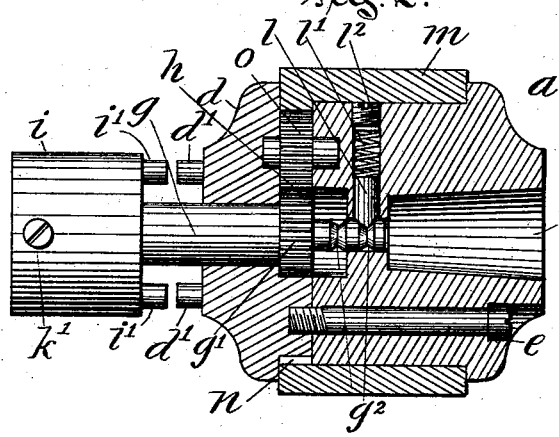
Figure 3:
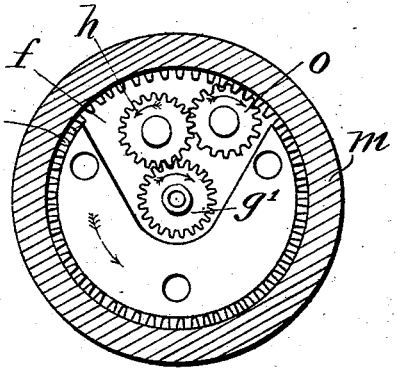

Referring to the drawings: Figure 1 is a detail side view of my improved tap holder illustrating the manner of its use. Fig. 2 is a detail view in lengthwise central section of the tap holder. Fig. 3 is a detail view in cross section of the tap holder showing the reversing gears.

In the accompanying drawings the letter $a$ denotes the body of the holder, which is preferably a cylindrical block of metal, as steel, having at one end means of attachment to a live spindle or arbor $b$ of a lathe or other suitable machine tool, the socket $c$ in the form of holder described serving as a direct means of attachment. A cap $d$ is secured to the outer end of the holder, as by means of screw bolts $e$, and between this cap and the end of the body $a$ there is a recess $f$ in which the gear wheels of the reversing mechanism are located. A shaft $g$ extends through a central hole in the cap and bears on its inner end a pinion $g'$ that is adapted to be thrown into or out of engagement with a gear wheel $h$ of the train of gears of the reversing mechanism. This spindle bears on its outer end a chuck or head $i$ adapted to securely hold a tap $k$ as by means of a binding screw $k'$ which extends through a threaded socket in the head and binds upon the shank of the tap.

The main body of the holder, including the cap $d$, and the head $i$ are adapted to be connected by means of the clutch parts formed by the pins or shoulders $i'$ extending from the rear end of one part and the pins or shoulders $d'$ extending from the other part. These pins are made of such a length as to enable them to pass each other when the head is extended, as shown in Fig. 2 of the drawings, and permit a rotary movement of the body part without turning the head also.

The inner end of the shaft $g$ is reduced in diameter and has the grooves $g^2$ adapted to be engaged by the pointed end of a spring catch $l$. This spring catch is located in a socket in the body $a$ of the holder and is thrust inward as by means of a spring $l'$, the outer end of the socket opening being closed as by means of a short screw $l^2$. When the shaft $g$ is at the inner limit of its play, as shown in Fig. 1 of the drawings, the rotary movement of the spindle $b$ turns with it the holder, and the pins or shoulders striking corresponding pins on the head turn that also in the same direction of movement. This direction of movement is such as to cause the tap $k$ to be advanced into a nut held in a suitable chuck and to cut a thread therein. After the thread has been cut it is desirable to remove the tap, and this is accomplished by drawing back the spindle $b$ and with it the body of the holder until the parts have assumed the relative position illustrated in Fig. 2 of the drawings.

On the body part there is supported a loose sleeve $m$ having an internal gear $n$ which is in engagement with a gear wheel, $o$, of the train of gears of the reversing mechanism. This sleeve is preferably knurled on the outer surface, or it may be provided with means which will enable it to be easily held either by the hand or by means of any special tool. The spindle $b$ is supposed to be driven constantly in one direction and it is the object of my invention to provide a simple and compact tool which may be secured to the end of such a live spindle so as to remove the necessity of providing any reversing mechanism for the spindle of the machine tool. The spindle, as $b$, being driven in one direction carries with it the holder $a$ and the sleeve $m$, but when the latter is held as by grasping it with the hand, or as by means of any suitable tool or device, this rotary movement is stopped and the body $a$ continuing its revolution will drive the gear wheel in the opposite direction as indicated by the arrow in Fig. 3 of the drawings. Through the medium of the idler $h$ of this train of gears a motion in a reverse direction is imparted to the pinion $g'$ and to the shaft $g$ on which the tool holding head $i$ is secured or of which it forms a part. The result of this rotary movement of the head will be to withdraw the tap from the thread in the nut or other like part in which a thread has been cut. A longitudinal reverse movement of the spindle $b$, or like part, is effected by the usual appliances on either a screw cutting machine, speed lathe, drill press or like machine tool in which the tool holder is usable.

In the further operation of the device another thread may be cut by giving a forward movement to the tool and when the tap encounters the work the two parts of the holder will be closed toward each other so as to cause the shoulders or pins $i'$ $d'$ to be again thrown into engagement, the catch $l$ holding the head in the inward position until a positive force in the line of the axis of the holder is exerted to give a lengthwise outward movement to the shaft $g$ and disengage the shoulders.

I claim as my invention—

1. In combination with a body part, a loose sleeve mounted on the body part and revoluble thereon and bearing an annular gear, a rotary shaft mounted in the body part and having a lengthwise movement in its bearings therein, the outer end of said shaft having a tap holding device and the inner end bearing a pinion adapted to mesh with the train of reversing gears, the reversing train of gears, and the clutch appurtenant to the body part and rotary shaft respectively, all substantially as described.

2. In combination in a reversing tap holder, a body part having means for attachment to a live spindle, a sleeve loosely borne on the body part and having an internal gear, a tap holding shaft having a lengthwise and rotary movement within the body part, a pinion borne on the inner end of said shaft and adapted to be moved into and out of engagement with the train of reversing gears, the reversing gears, the catch device located within the body part and adapted to hold the shaft at either limit of its play, and a clutch device appurtenant to the body part and tap holding shaft, all substantially as described.

3. In a reversing tap holder, in combination, a body part having means for attachment to a live spindle, a sleeve loosely mounted on the body part and having an internal annular gear, a tap holding shaft loosely mounted in the body part and having a rotary and also a lengthwise sliding movement in bearings in the body part, reversing gears located within the body part, and a clutch adapted to unite temporarily the body part and the tap holding shaft, all substantially as described.

4. In combination in a reversing tap holder, a body part having a shoulder, a cap secured to the body part as by means of screw bolts, a loose sleeve borne on the body part and having an internal gear, a recess formed between the body part and the cap, reversing gears located in said recess, a rotary and lengthwise movable shaft held in a bearing in the cap, a pinion secured to the shaft, the extended inner end of the shaft having grooves, a spring catch borne in a socket in the body part and adapted to engage the grooves in the shaft, a tap holder borne on the outer end of the shaft, and the fixed pins arranged on the body part and cap respectively whereby a positive clutch is formed, all substantially as described.

FREDERICK C. McCLARY.

Wisnesses:
CHAS. L. BURDETT,
JOSEPH ARTHUR CANTIN.